Aug. 17, 1937.    J. H. CONNOR ET AL    2,090,030
DRIER
Original Filed March 18, 1935
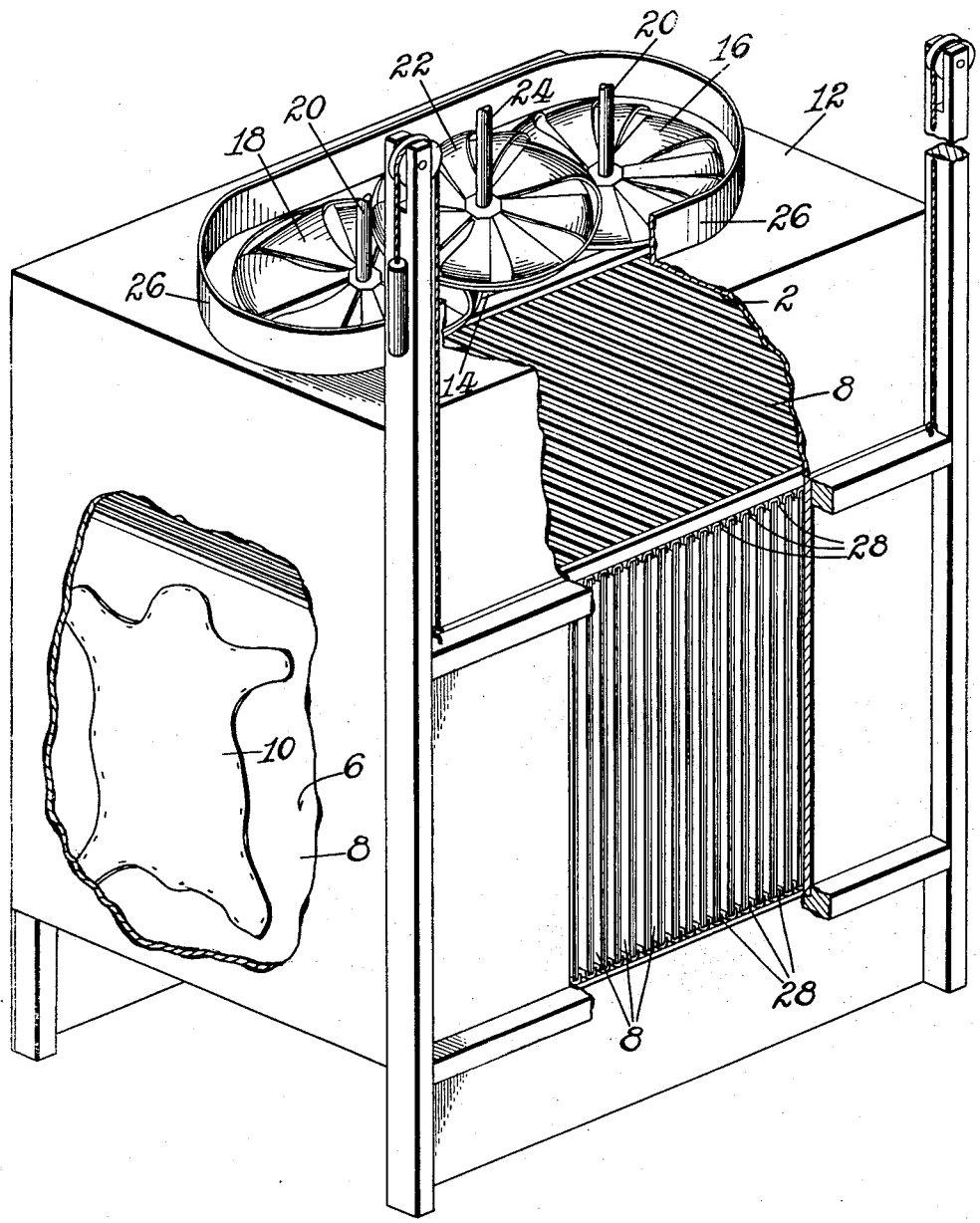
INVENTOR.

Patented Aug. 17, 1937

2,090,030

UNITED STATES PATENT OFFICE 2,090,030

DRIER

John H. Connor, Newton, and Matthew M. Merritt, deceased, late of Middleton, Mass., by Anna P. Merritt, Middleton, Mass., administratrix, assignors to The Tanning Process Company, Boston, Mass., a corporation of Massachusetts Original application March 18, 1935, Serial No. 11,594. Divided and this application December 24, 1936, Serial No. 117,666

3 Claims. (Cl. 34—40)

This invention relates to driers for sheet material. While the invention is illustrated as embodied in a drier for hides and skins stretched out upon drying boards or frames, it will be understood that the invention and various important features thereof may have other applications and uses.

This application is a division of application Serial No. 11,594, filed March 18, 1935 in the names of John H. Connor and Matthew M. Merritt.

In the illustrated drier, there is advantageously employed a well-known type of blower having its operating shaft arranged at a right angle to the body of the blower. This type of blower moves the air at a maximum rate at and near the periphery of the blower, whereas air is moved very much slower and in much smaller quantity at and near to the axis of the blower. Hence in utilizing this type of blower, provision is made for arranging the blowers in sets with a blower in a plane at one side of and overlapping to a substantial extent two blowers in another plane with their peripheries only slightly spaced from each other, whereby a blower located in an upper level, as in the illustrated construction, supplies air to the central portions of two blowers in a lower level. In this way a practically uniform flow of air may be obtained through the drier.

These and other important features of the invention and novel combinations of parts will now be described in detail in the specification and then pointed out more particularly in the appended claims.

The drawing is a perspective view of a drier, with parts of the walls thereof broken away, illustrating one embodiment of the invention.

In the illustrated apparatus, which is specially designed for the drying of hides and skins, there is provided an air chamber 2 above a drying chamber 6 which contains drying frames 8 having put-out skins 10 tacked thereon. The said chamber 2 has a flat top wall 12 provided with an opening 14 in which are mounted two fans 16 and 18, the said fans being of a well-known commercial type and rotatable with their lower faces in substantially the same horizontal plane, each being secured to a vertically arranged shaft 20 driven from any suitable source of power. The fans 16 and 18 are arranged with their peripheries near to each other and are of a size to extend over substantially the full length of the drier. Since air is forced downwardly in greater quantity at and near to the periphery of each of the fans 16 and 18 than at the central portion of each of said fans, there is provided a third fan 22 also mounted on a vertically arranged driven shaft 24, the said fan 22 being arranged to overlap the fans 16 and 18 nearly to the vertical shaft 20 of each of said fans. The purpose of the fan 22 is to create and direct an adequate supply of air to the middle portions of each of the fans 16 and 18, thereby making substantially uniform the currents of air which are forced downwardly through the air chamber 2 and over all of the drying boards or frames 8 of the drying chamber 6. To assist the fans 16, 18 and 22 in the drawing of air through the opening 14 into the air chamber 2, there is provided a wall 26 which surrounds the opening 14 and gives direction to the air currents created by said fans. As shown the boards 8 are slidably held by guideways 28 at top and bottom of the chamber 6 which is otherwise freely open to the air at both top and bottom of the drier.

In drying hides or skins in the illustrated drier, a hide or skin 10 is first stretched out and secured to a drying board or frame 8 and is then placed within the drying chamber 6 by inserting the drying board or frame in corresponding upper and lower guideways 28 by which the drying board or frame is held in a substantially vertical plane in the desired spaced relation with respect to adjacent pieces of work. Upon starting the blowers 16, 18, 22, in operation, unsaturated air from a suitable source is drawn into the drier and is forced downwardly in substantially uniform amounts over the surfaces of the hides or skins in the drying chamber 6, the air escaping at the lower end of the drying chamber either into the room or into a tunnel to conduct the air to an air conditioning chamber before it is returned to the drier at the top thereof. The best results are attained when air at ordinary room temperatures is passed over the hides or skins during the drying operation.

Having described our invention, what we claim as new and desire to secure by Letters Patent of the United States is:

1. In a drier, a chamber having an outlet and an inlet for air, and a plurality of blowers turning about axes at right angles to said blowers and arranged at the inlet of the chamber, said blowers being arranged in parallel planes and in such manner that a blower in one plane supplies air to central portions of two blowers in another plane, whereby air is effectively distributed to work pieces in said chamber.

2. In a drier, a chamber having means for supporting pieces of work, an outlet for air at one end of said chamber, an inlet for air at another end of said chamber, and a plurality of blowers turning about axes at right angles to said blowers and arranged at the inlet end of the chamber, said blowers being arranged in parallel planes and in such manner that a blower in one plane supplies air to central portions of two blowers in another plane, whereby air is effectively distributed to work pieces in said chamber.

3. In a drier for sheet material, a chamber having guideways for positioning and supporting pieces of work in vertical parallel planes, an outlet for air at the lower end of said chamber, an inlet for air at the upper end of said chamber, and a plurality of blowers turning about vertical axes and arranged to extend nearly the full length of the chamber at the inlet end thereof, said blowers being arranged in two levels one above the other and in such manner that an upper blower supplies air to central portions of two blowers below, whereby air in substantially uniform amounts is supplied to work pieces in all portions of said chamber.

JOHN H. CONNOR.
ANNA P. MERRITT,
*Administratrix of the Estate of Matthew M. Merritt, Deceased.*